United States Patent
Pajovic et al.

(10) Patent No.: US 10,917,192 B2
(45) Date of Patent: Feb. 9, 2021

(54) SYMBOL DETECTION IS SHARED WIRELESS CHANNEL SUBJECT TO JAMMING INTERFERENCE

(71) Applicant: Mitsubishi Electric Research Laboratories, Inc., Cambridge, MA (US)

(72) Inventors: Milutin Pajovic, Cambridge, MA (US); Koike Akino Toshiaki, Lexington, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 16/351,975

(22) Filed: Mar. 13, 2019

(65) Prior Publication Data

US 2020/0295863 A1   Sep. 17, 2020

(51) Int. Cl.
*H04K 3/00* (2006.01)
*G06N 3/04* (2006.01)
*H04B 1/7105* (2011.01)

(52) U.S. Cl.
CPC .............. *H04K 3/25* (2013.01); *G06N 3/0454* (2013.01); *H04B 1/7105* (2013.01); *H04K 3/22* (2013.01)

(58) Field of Classification Search
CPC .. H04B 1/7097; H04B 1/7103; H04B 1/7105; H04B 7/0452; H04B 1/10; H04K 3/22; H04K 3/25; H04K 3/228; H04L 25/03305; H04L 25/03331; G06N 3/0454
See application file for complete search history.

(56) References Cited

U.S. PATENT DOCUMENTS

| | | | | |
|---|---|---|---|---|
| 5,831,984 A | * | 11/1998 | Hottinen | H04B 1/7105 370/441 |
| 7,035,354 B2 | * | 4/2006 | Karnin | H04L 25/067 375/322 |
| 8,515,335 B2 | * | 8/2013 | Dafesh | H04K 3/228 455/1 |
| 10,326,547 B2 | * | 6/2019 | Yuan | H04L 27/26 |

* cited by examiner

*Primary Examiner* — Betsy Deppe
(74) *Attorney, Agent, or Firm* — Gennadiy Vinokur; James McAleenan; Hironori Tsukamoto

(57) ABSTRACT

A communication system receives a jammed signal including a sequence of complex numbers encoding one or combination of symbols transmitted by multiple transmitters. The system transforms the sequence of complex numbers into an image of real numbers having at least two columns and multiple rows, with real values of real and imaginary parts of each complex number forming different columns but the same row of the first image, processes the image with a neural network trained to suppress the wideband signal in the received signal, and detects the symbols transmitted by the transmitters from the de-jammed signal.

7 Claims, 15 Drawing Sheets

SYMBOL DETECTION IS SHARED WIRELESS CHANNEL SUBJECT TO JAMMING INTERFERENCE

TECHNICAL FIELD

The present disclosure relates to communications systems and more particularly to packet collision detection for decoding symbols transmitted over shared wireless channel in multi-user communication systems, in which the shared wireless channel is subjected to jamming interference signal.

BACKGROUND

In general, multiuser detection deals with demodulation of the mutually interfering digital streams of information that occur in areas such as wireless communications, high-speed data transmission, DSL, satellite communication, digital television, and magnetic recording. The multiuser detection is also being currently investigated for demodulation in low-power inter-chip and intra-chip communication.

Multiuser detection encompasses technologies devoted to joint detection of interfering signals received over a shared channel Mutual interference is unavoidable in modem spectrally efficient wireless systems: even when using orthogonal multiplexing systems such as TDMA, synchronous CDMA or OFDMA, multiuser interference originates from channel distortion and from out-of-cell interference. In addition, in multi-antenna (MIMO) systems, the digitally modulated streams emanating from different antennas interfere at the receiver, and the MIMO receiver uses multiuser detection techniques to separate them. By exploiting the structure of the interfering signals, multiuser detection can increase spectral efficiency, receiver sensitivity, and the number of users the system can sustain.

For example, consider a communication system where users (transmitters) are in communication with a single receiver, such as a base station and/or an access point. The users transmit in the same frequency band and potentially in the same time slot, and are equipped with spreading codes so that the receiver can separate their transmissions (i.e., detect symbols they transmit). The separation is done by means of filter bank in the receiver's front end. The filter bank includes correlators, each correlator correlates the received signal with a certain code, specific to such a correlator. In a conventional multi-user detection system, the number of correlators in the filter bank is equal to the number of spreading codes used by transmitters, so that each correlator is associated with one transmitter. In addition, the spreading codes in the conventional system are designed to be orthogonal or close to be orthogonal.

The number of orthogonal spreading codes is limited, and can be insufficient for a multiuser communication system, such as IoT systems with hundreds or even thousands of users/transmitters. Such a deficiency leads to the usage of non-orthogonal codes, which in turn leads to packet collisions and to challenging packet recovery problems, see, e.g., U.S. Publication 2017-0244815. To that end, a method described in U.S. patent application Ser. No. 15/977,024 exploits sparsity in the user activity domain to formulate the symbol separation problem as a sparse recovery problem.

In addition to the increased complexity of symbol separation problem, there is a need for a method for separating collided signals from multiple users in the presence of strong and wideband interference/jamming signal. For example, consider a random access channel framework where few out of a large number of users, equipped with spreading codes, synchronously transmit symbols. The received signal is a noisy mixture of the symbols transmitted through users' flat fading channels, impaired by fast frequency hopping jamming/interference signal of relatively large power. Some methods use independent component analysis (ICA) and robust principal component analysis (PCA) to separate jammed CDMA users of unknown channels. However, these methods place limitations on the maximum number of transmitting users and/or limitations on signal transmissions.

Hence, there is a need for a method that first suppresses the interference and extracts the mixture of symbols transmitted by active users, and then detects active users and their transmitted symbols.

SUMMARY

It is an object of some embodiments to provide a system and a method to suppress a wideband jamming/interfering signal so as to enable separation of symbols from active users. It is another object of some embodiments to provide a system and a method that are suitable to suppress jamming signal and decode multi-user transmission over a shared channel. For example, it is an object of one embodiment to provide jammer suppression and/or synchronous CDMA detection.

Some embodiments are based on recognition of potential advantages of deep learning (DL) and neural networks (NN) in the field of communication. Despite its enormous success in other fields, DL has recently started to be considered as a supplement or alternative to other signal processing techniques for communications. However, in comparison to applications of DL in communications, some embodiments consider a different problem of interference/jammer suppression using the DL. To the best of our knowledge, no other reference is studying DL for jammer suppression and/or synchronous CDMA detection.

Some embodiments are based on recognition of similarities between jamming suppression problem and an image denoising problem. Indeed, the jammed signal can be thought as an image corrupted with noise. Under this intuition, the techniques used for image denoising can be adapted for suppressing the jammed signal. For example, some embodiments, inspired by one state-of-the-art image denoising method, transform a sequence of complex numbers of the received signal into an image of real numbers and use a deep learning architecture based on convolutional neural networks (CNN) for suppressing jammer's signal. For example, one embodiment represents the sequence of complex numbers of the received signal into a two columns image having real and imaginary parts of each complex number in the sequence to form a row of the image. After the deep learning model yields a jammer-free signal, the embodiment can employ reduced dimension decorrelating (RDD) algorithm to separate active users.

Accordingly, one embodiment discloses a communication system, including a receiver including an antenna to receive a signal including a sequence of complex numbers encoding one or combination of symbols transmitted by multiple transmitters over wireless channels connecting the transmitters with the communication system, wherein the signal is jammed with a wideband signal; a memory configured to store a convolutional neural network trained for denoising images formed by real numbers of real and imaginary parts of complex numbers in sequences of complex numbers representing different signals; a processor configured to transform the sequence of complex numbers of the received signal into a first image of real numbers having at least two columns and multiple rows, wherein real values of real and imaginary parts of each complex number form different columns but the same row of the image; process the first image with the neural network to suppress the wideband signal in the received signal; and detect the symbols transmitted by the transmitters from the processed signal; and an output interface configured to render the detected symbols.

In effect, the transformation of the signal into the image of real numbers having real and imaginary parts located on the same row but at different columns allows to using a convolutional neural network to suppress the jamming signal.

After the jamming signal is suppressed, various methods can be used for symbol detection in random-access channel (RACH). For example, some embodiments takes advantage of CDMA transmission for jammer suppression and/or synchronous CDMA detection. In CDMA transmission, each symbol is encoded with a spreading code selected from a set of spreading codes. After the signal is received, the signal is processed with a set of filters corresponding to the spreading codes to remove the effects of the spreading codes. Hence, it is possible to process the unfiltered and filtered versions of the received signal by the neural network to increase its effectiveness.

For example, in one embodiment, each symbol is encoded with a spreading code selected from a set of spreading codes, and the duration of the received signal is at least the duration of the spreading code, and wherein the length of the sequence of complex numbers of the signal is equal to the size of the set of spreading codes.

The convolutional neural network is trained for denoising the images using the signals with encoded symbols and corresponding signals filtered from effects of the spreading codes. In addition, in this embodiment, the processor is configured to process the sequence of complex numbers of the received signal with a set of filters, each filter correspond to one of the spreading codes and configured to remove effects of the corresponding spreading code, to produce a filtered sequence of complex numbers; transform the filtered sequence of complex numbers into a second image having at least two columns and multiple rows, wherein real values of real and imaginary parts of each complex number in the filtered sequence of complex numbers form different columns but the same row of the image; combine the first image and the second image into a tensor; and process the tensor with the neural network to suppress the wideband signal in the received signal. In effect, the dual processing of the received signal using a tensor with filtered and unfiltered images increases quality of jamming suppression.

Some embodiments are based on realization that the way the received signal is processed and formatted into the input tensor, as well as the selection of the specific DL model, can be intuitively justified from at least two perspectives. First, the input tensor resembles a distorted two-channel image since it originates from a jammed useful signal, and the expectation is that a model that yields state-of-the-art image denoising performance is also a promising approach for de-jamming the received signal. More importantly, note that feeding the DL model with the filter bank output, together with the received signal and in the described way, is particularly effective. This is because the convolution sublayer in the proposed DL model performs weighted combination of neighboring entries in the input tensor over a patch of relatively small dimensions. In particular, the entries from the i-th row of the first channel correspond to the i-th chip's samples of the received signal. On the other hand, the i-th row of the second channel is the noisy sum of the user i's transmitted symbol and weighted combination of the jamming signal's chip-rate samples with the elements of the corresponding spreading code. In other words, while the first channel carries a sample of the jamming signal, the second channel in the same coordinates contains a despreaded jamming signal. Furthermore, assuming the jamming signal changes on a time scale of few chips, the entries in the neighboring rows in both channels contain imprint of the same jamming signal structure. Finally, the entries corresponding to the same row in each channel are real and imaginary parts of either a received signal sample in the first channel, or filtered version of the received signal with the corresponding spreading code in the second channel. Consequently, computing weighted combinations of neighboring entries over two columns, two channels and across a few consecutive rows, whose number depends of the convolution kernel size, effectively combines entries that carry same or similar type of information on the jamming signal. Overall, the expectation is that the DL model through multiple convolution layers thus learns how to suppress the jamming signal.

Accordingly, one embodiment discloses a communication system including a receiver including an antenna to receive a signal including a sequence of complex numbers encoding one or combination of symbols transmitted by multiple transmitters over wireless channels connecting the transmitters with the communication system, wherein the signal is jammed with a wideband signal; a memory configured to store a neural network trained for denoising images formed by real numbers of real and imaginary parts of complex numbers in the sequence of complex numbers representing the received signal; a processor configured to transform the sequence of complex numbers of the received signal into a first image of real numbers having at least two columns and multiple rows, wherein real values of real and imaginary parts of each complex number form different columns but the same row of the first image; process the first image with the neural network to suppress the wideband signal in the received signal to produce a de-jammed signal; and detect the symbols transmitted by the transmitters from the de-jammed signal; and an output interface configured to render the detected symbols.

Another embodiment discloses a communication method, wherein the method uses a processor coupled with stored instructions implementing the method, wherein the instructions, when executed by the processor carry out steps of the method, includes receiving a signal including a sequence of complex numbers encoding one or combination of symbols transmitted by multiple transmitters over wireless channels connecting the transmitters with the communication system, wherein the signal is jammed with a wideband signal; transforming the sequence of complex numbers of the received signal into a first image of real numbers having at least two columns and multiple rows, wherein real values of real and imaginary parts of each complex number form different columns but the same row of the first image; processing the first image with a neural network trained for denoising images formed by real numbers of real and imaginary parts of complex numbers in the sequence of complex numbers representing the received signal to suppress the wideband signal in the received signal to produce a de-jammed signal; detecting the symbols transmitted by the transmitters from the de-jammed signal; and rendering the detected symbols.

Yet another embodiment discloses a non-transitory computer readable storage medium embodied thereon a program executable by a processor for performing a method. The method includes receiving a signal including a sequence of complex numbers encoding one or combination of symbols transmitted by multiple transmitters over wireless channels connecting the transmitters with the communication system, wherein the signal is jammed with a wideband signal; transforming the sequence of complex numbers of the received signal into a first image of real numbers having at least two columns and multiple rows, wherein real values of real and imaginary parts of each complex number form different columns but the same row of the first image; processing the first image with a neural network trained for denoising images formed by real numbers of real and imaginary parts of complex numbers in the sequence of complex numbers representing the received signal to suppress the wideband signal in the received signal to produce a de-jammed signal; detecting the symbols transmitted by the transmitters from the de-jammed signal; and rendering the detected symbols.

DETAILED DESCRIPTION

Figure 1A:
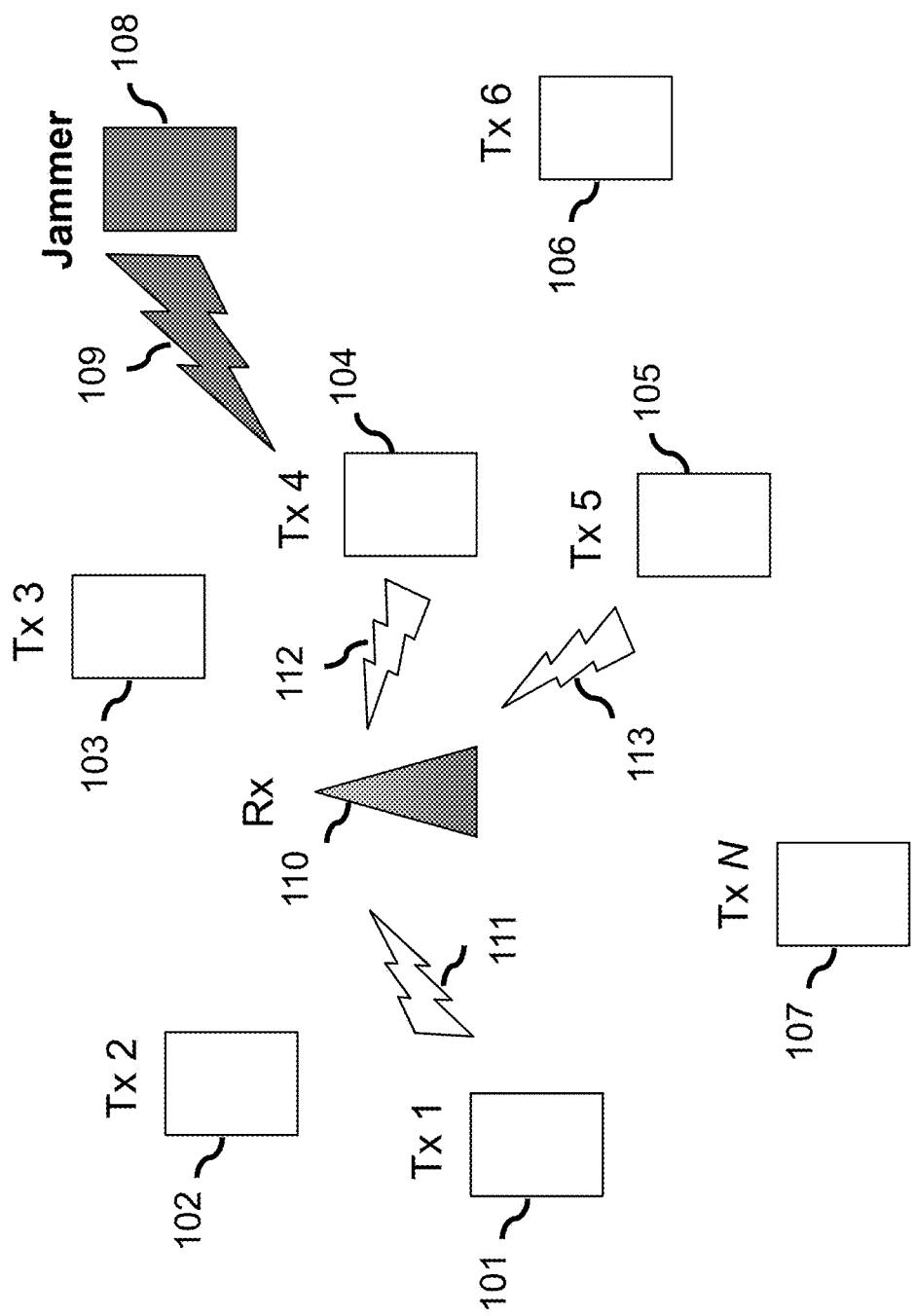
FIG. 1A shows a schematic of random access communication of multiple transmitters subject to a jamming signal suppressed according to principle used by some embodiments.

FIG. 1A shows a schematic of random access communication of multiple transmitters subject to a jamming signal suppressed according to principle used by some embodiments. Massive machine type communications (mMTC) have been identified as one of three broad categories of the emerging 5G use cases and scenarios. For example, referring to FIG. 1A, the mMTC embodies a random connectivity setup of hundreds, or even thousands of users 101, 102, 103, 104, 105, 106, 107 that are in grant-free communication with the same base station 110 over a shared wireless channel and occasionally transmit short messages 111, 112, 113 that collide. As used herein, a user is a transmitter, such as any transmitting device or machine participating in the random access communication.

Employing one of numerous channel access mechanisms to reduce likelihood of collisions is seen impractical due to a relatively large overhead required for network coordination. This has prompted research efforts in designing physical-layer methods for separating collided signals, where sparsity in user activity domain is a feature exploited for that task. Hence, a variety of methods have been proposed to separate colliding users. For example, some embodiments consider user messages comprising of the same, known preamble and information-bearing payloads, while in some other embodiments, users are equipped with non-orthogonal spreading codes to facilitate their separation. Additionally, or alternatively, some embodiments leverage sparsity in the user activity domain to separate colliding packets.

In some situations, interference 109 originating from other nearby systems or malicious jammers 108 detrimentally impact user separation performance of the proposed algorithms. Hence, some embodiments consider such a complex communication scenario necessitating separation of colliding packets transmitted by different transmitters in the presence of an interference originating from other nearby systems or malicious jammers. For example, a communication system with a large number of IoT devices may be maliciously jammed so that messages delivering critical sensor measurements cannot be recovered. Therefore, there is a need for methods for jammer suppression and separation of transmission from active users in random connectivity systems.

Figure 1B:
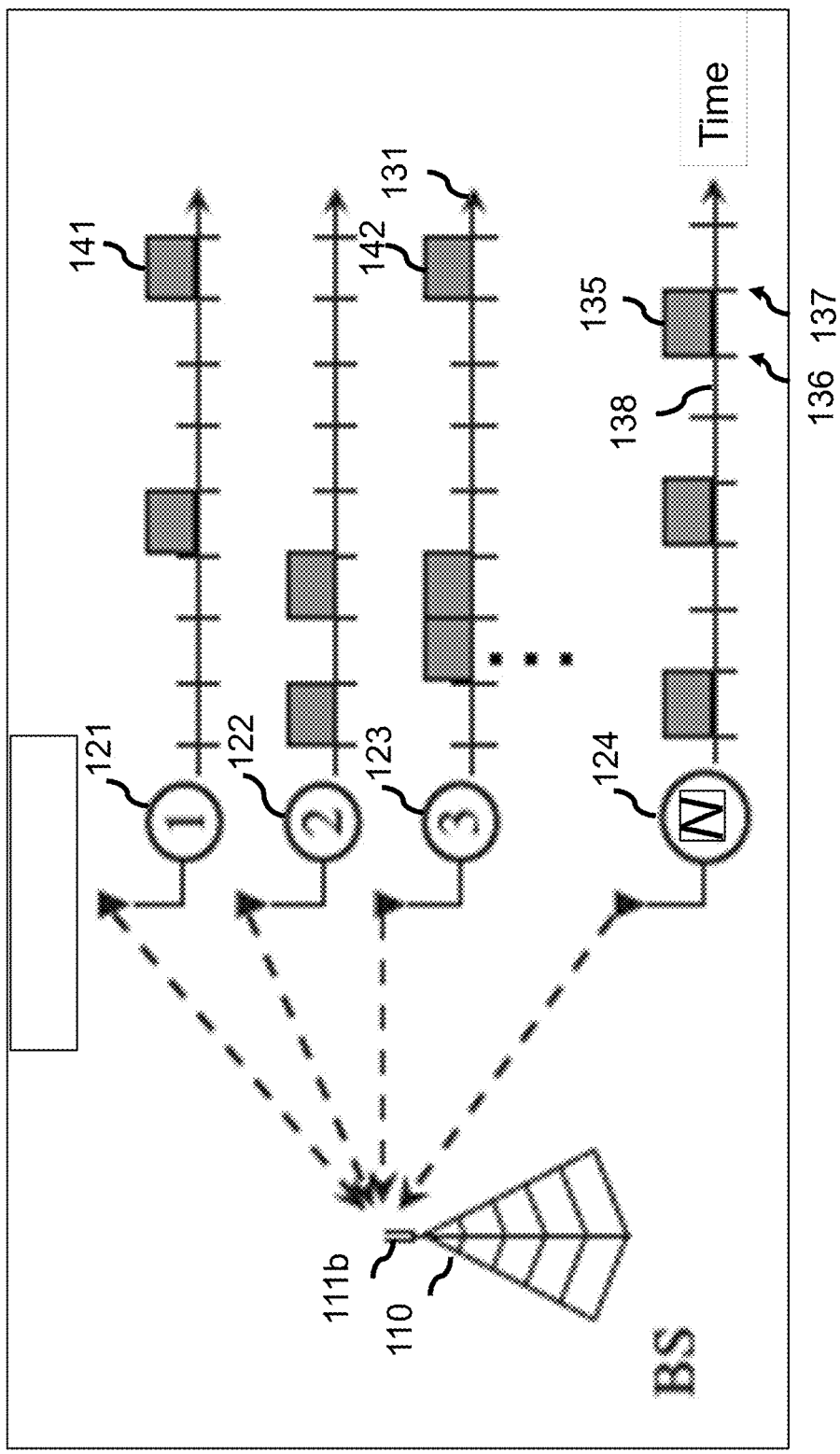
FIG. 1B shows a schematic of exemplar random access communication of multiple transmitters according to some embodiments.

FIG. 1B shows a schematic of exemplar random access communication of multiple transmitters according to some embodiments. In this example, N users 121, 122, 123, 124 are in communication with a common base station/access point 110 over a shared wireless channel. The users are equipped with spreading codes of spreading factor S. As such, user i's chip-rate discrete-time domain representation of the spreading code is $s_i \in \mathbb{C}^{S \times 1}$. The spreading codes are arranged into a matrix of spreading codes, $S \in \mathbb{C}^{S \times N}$, such that its i-th column is $s_i$. We assume the users are in perfect synchronization, meaning that they have a common time reference 131 as to when a signaling time (i.e., symbol time) 138 starts 136 and ends 137. Each user sends a (possibly) precoded data symbol $x_i$ during signaling interval 135 which undergoes a frequency flat fading channel $h_i \in \mathbb{C}$ before it reaches the receiver. Since users share communication channel, collisions occur when two or more users send information 141, 142 during the same signaling period. The mixture of the signals transmitted during one signaling period is then given by $$y = HSx \qquad (1)$$

where H is a diagonal matrix of users' channels such that $[H]_{ii}=h_i$, while $x \in \mathbb{C}^{N\times 1}$ is a vector of transmitted data from all users such that if a user j is inactive/silent during the considered signalling period, its corresponding transmitted symbol $x_j=0$.

In addition to perfect time synchronization, another common approach in grant-free massive connectivity framework is to assume that all user channels are known at the receiver side. However, in some embodiments, this assumption is relaxed, e.g., based on sparse recovery techniques. In short, channel reciprocity inherent to the time domain duplex (TDD) system implies that the channel between the BS and user i is equal to the channel in the opposite direction, $h_i$. Therefore, the BS broadcasts known pilot symbols that user i receives and exploits to estimate its channel $h_i$. Due to time synchronization, all users are able to estimate their channels in parallel. Assuming perfect channel estimation, each user i precodes its symbol $b_i$ with normalized zero-forcing (ZF) precoder such that its transmitted data $x_i$ before spreading is given by $$x_i = b_i p_i = b_i \frac{h_i^*}{|h_i|} \quad (2)$$

where $p_i$ is the precoder. Substituting (2) into (1) yields $$y = \tilde{H}Sb \quad (3)$$

where $\tilde{H}$ is a diagonal matrix of user channels' magnitudes, i.e., $\tilde{H}=\text{diag}(|h_1|, |h_2|, \ldots, |h_N|)$, while b is a vector of transmitted symbols. An inactive user is assumed to transmit zero symbol and thus $b_i \in \mathcal{M} \cup \{0\}$, where $\mathcal{M}$ is the symbol alphabet for the utilized modulation format.

The transmitted signals from the users are impaired by a wideband jamming signal 109, transmitted by a malicious jammer 108. The jamming signal is modeled as a fast frequency hopping signal, meaning that the jammer quickly jumps over different and randomly chosen frequencies during users' one symbol period. Formally, the chip rate samples of the jamming signal are stacked into a vector $z \in \mathbb{C}^{N\times 1}$, given by $$z = [A e^{j2\pi f_k(k-1)+\phi_k}]_{k=1}^{S} \quad (4)$$

where A is the magnitude, and $f_k \sim U[0,1]$, $\phi_k \sim U[0,2\pi]$ are, respectively, uniformly sampled jammer's frequency and phase at the time instant of the k-th chip. In the most extreme scenario, $f_k$ and $\phi_k$ change with each k. Alternatively, $f_k$ and $\phi_k$ are piece-wise constant over a certain number of chips, which is the case in our numerical study, where jammer's frequency and phase are kept constant over a randomly chosen number of chips.

In such a manner, accounting for noise, the signal received on an antenna 111b of the base station is after standard pre-processing including filtering, conversion to the baseband and sampling finally given in the discrete-time domain by $$r = y + z + v \quad (5)$$

where v is circularly symmetric additive white Gaussian noise of variance $\sigma^2$, i.e., $v \sim \mathcal{CN}(0,\sigma^2 I_S)$.

Figure 1C:
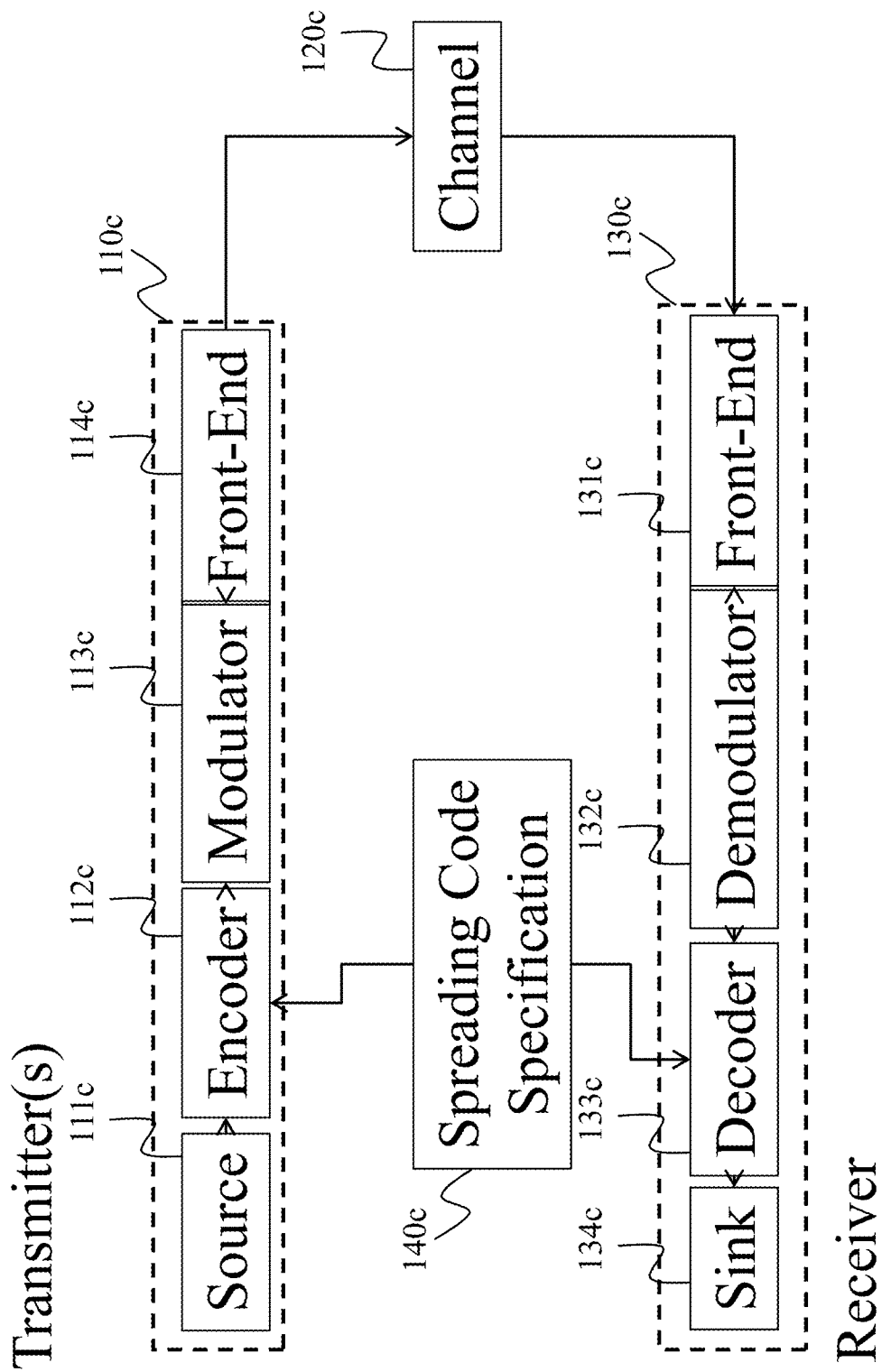
FIG. 1C shows a communications system for transmissions of data symbols from a transmitter 110c to a receiver 130c over a channel 120c according to some embodiments.

FIG. 1C shows a communications system for transmissions of data symbols from a transmitter 110c to a receiver 130c over a channel 120c according to some embodiments. For example, the communication channel 120c includes air medium for radio communications, copper cable for wired communications, solid-state drive for data storage transferring, and fiber cable for fiber-optic communications. During the communications, the digital data can be corrupted by noise in the channel as well as malicious wideband jamming signal. The transmitter 110 encodes the transmitted signal using one of various modes of transmission suitable for random access communication. Examples of such modes of transmission include various multiplexing techniques, such as TDMA, CDMA or OFDMA.

For example, in the CDMA, each user is equipped with a spreading code which acts upon its data symbols such that the output signals are spread in frequency domain. If spreading codes are orthogonal, the users can be separated in the receiver by de-spreading, i.e., processing the received signal through a bank of spreading codes. In the TDMA, each user is given a separate time slot in which it transmits its signal. In FDM, each user is assigned a chunk of frequency range that does not overlap, providing means to separate users whose transmissions overlap in time. In the OFDMA case, the frequency chunks assigned to users overlap, but in a way that their signals are orthogonal and amenable for separation using the Discrete Fourier Transform (DTF) operation in the receiver.

When the signal is received from the multiple transmitters, 110c is encoded according to a mode of transmission, and a receiver 130c is to suppress the jamming signal in the received signal and to detect the symbols from the de-jammed signal using a detection method corresponding to the mode of transmission.

For example, at the transmitter 110c, the data to be sent comes from a source 111c configured to accept the original data. The source can include a memory to store the data, an input port to receive the data, and/or a device to generate the data. For example, in one embodiment, the source includes a voice communication device transforming an input voice signal into the digital data. The source data are encoded by an encoder 112c in dependence on the mode of transmission. Examples of the encoding include one of a number of source and/or channel codes such as turbo code, polar code, BCH code, Hamming code, and LDPC code. For example, in some embodiments that follows some principles of CDMA transmission, the wherein each symbol of the transmitted signal is encoded with a spreading code selected from a set of spreading codes 140c, which is also available to the receiver 130c.

The encoded data are modulated by a modulator 113c. The modulator uses various digital modulation formats such as quadrature-amplitude modulation (QAM) with and without linear transforms such as orthogonal frequency-division multiplexing (OFDM). The modulated data are transmitted into the channel via front-end circuits 114c, which can include electro-optic devices for optical communications and radio-frequency devices for radio communications. The front-end can also include signal pre-processing such as band-pass filter, precoding, power loading, pilot insertion, and pre-distortion.

The channel 120c combines the transmitted signal from multiple users into a single combined signal, distorts the transmitted signal with wideband jamming signal transmitted by a malicious user. In addition, the signal can be corrupted with noise. For example, the channel adds additive white Gaussian noise (AWGN), co-channel interference (CCI), deep fading, impulsive noise, inter-symbol interference (ISI), nonlinear interference (NLI) due to Kerr effect, and linear chromatic dispersion (CD).

The receiver 130c first converts the channel output into electrical received signals via front-end circuits 131c, which are typically complementary of the front-end 114c at the transmitter. For example, the front-end includes linear equalization, nonlinear equalization, adaptive filtering, channel estimation, carrier phase recovery, synchronization, and polarization recovery. The received signals are demodulated at a demodulator 132c to produce an initial estimate of the bits of the transmitted codeword, which are used by the decoder 133c for recovering the source data. The decoder 133c is configured to detect the symbols from the de-jammed signal using a detection method corresponding to the mode of transmission. In various embodiments, the decoder 133c uses the set of spreading codes to separate the colliding packets of multiple users. The decoded data are sent to a data sink 134c.

For example, in some embodiments, the received signal outputted by the front-end 131c is in digital domain, while the signal transmitted over the channel 120c is an analogous domain. To that end, the received signal outputted by the front-end 131c is a sequence of complex numbers representing the analogues signal transmitted over the channel 120c. In some implementations that use the spreading codes 140c, the length of the sequence of complex numbers of the signal is equal to the size of the set of spreading codes to simplify the computation. To that end, the front-end 131c partitions the stream of received data in the set of sequences of complex numbers of predetermined length. For example, if the set of spreading codes has 128 different codes, the sequences of complex numbers has 128 complex numbers. Each complex number includes a real part and an imaginary part.

The transmitter 110c and/or the receiver 130c can be implemented using a processor operatively connected to a memory. For example, the memory of the receiver 130c can store the set of spreading codes 140c, as well different modules of some embodiments for de jamming the received signal.

Figure 1D:
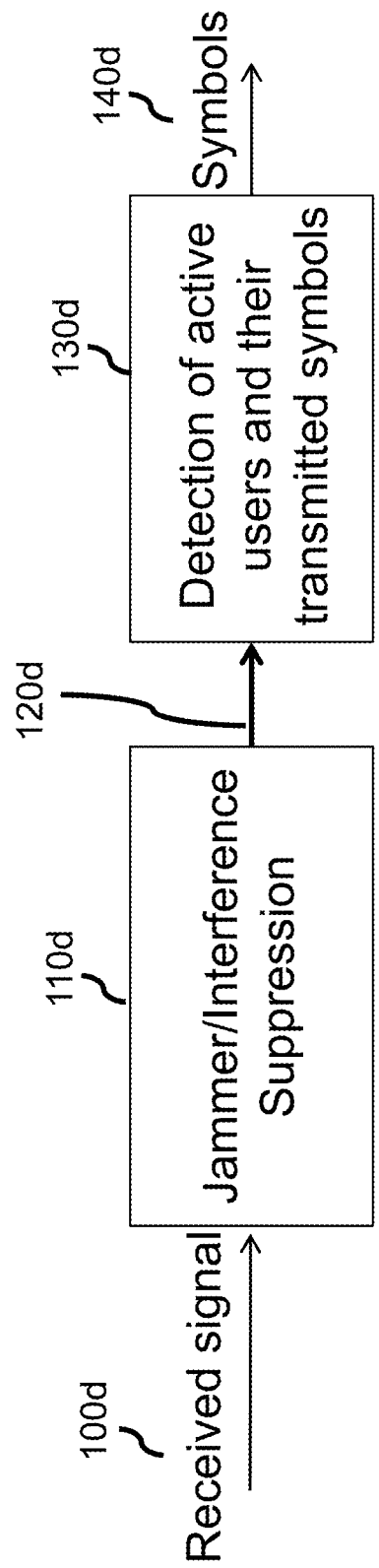
FIG. 1D shows a block diagram of a method for detecting symbols transmitted by a set of transmitters according to some embodiments.

FIG. 1D shows a block diagram of a method for detecting symbols transmitted by a set of transmitters according to some embodiments. The method can be implemented by a processor of the receiver as part of the decoder 133c, demodulator 132, or combination thereof. Additionally, or alternatively, the method can be implemented by a processor of the receiver as a separate module executed by the processor.

The received signal 100d is processed through a cascade of two blocks. The aim of the first block 110d is to suppress jamming signal and output a clean mixture of signals transmitted by active users 120d. This mixture is then an input to the second block 130d which outputs the indices of active users, along with their detected symbols 140d.

Figure 2A:
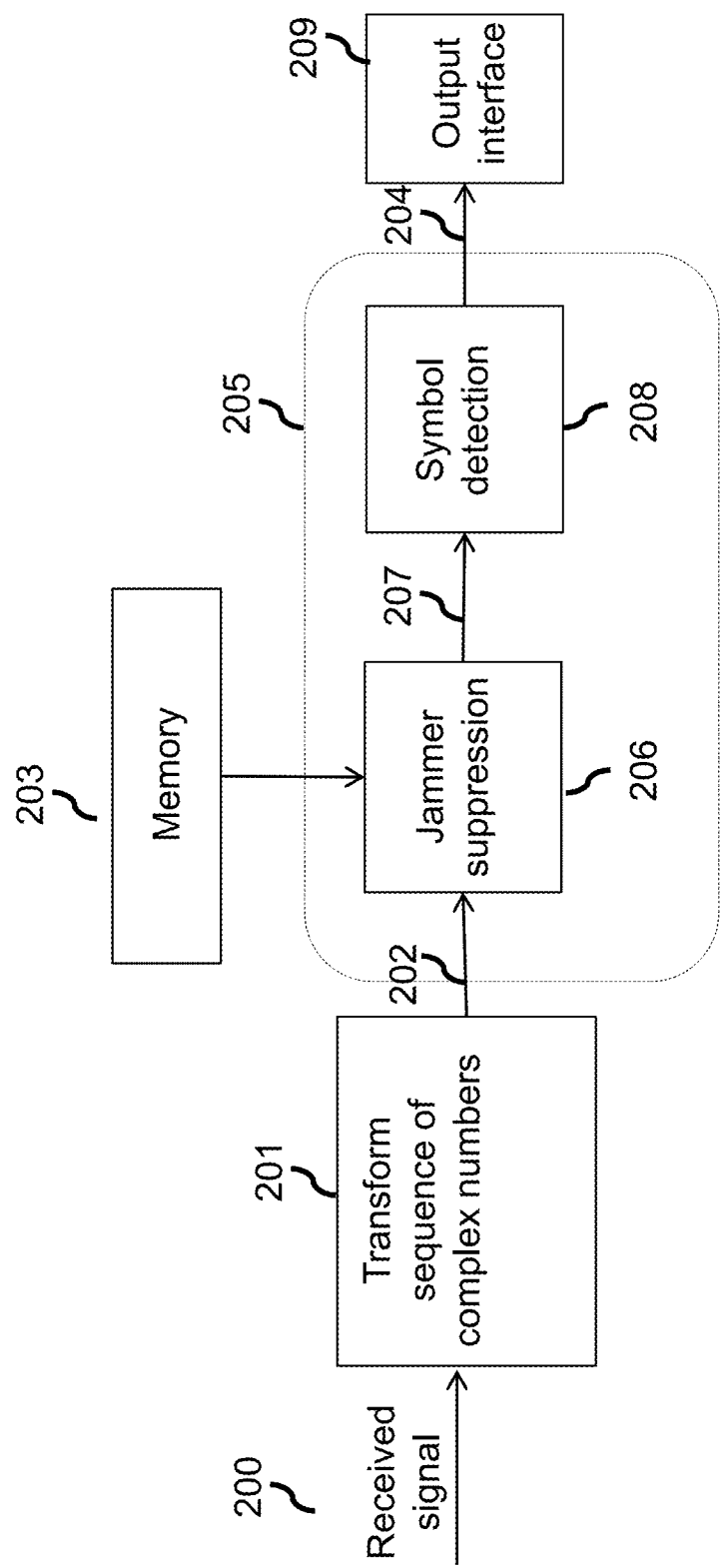
FIG. 2A shows a top-level schematic of a method for dejamming and detecting symbols according to some embodiments.

FIG. 2A shows a top-level schematic of a method for dejamming and detecting symbols according to some embodiments. The mixture of signals transmitted from active users and impaired by jamming signal after being received on an antenna of the base station or access point is pre-processed, which includes filtering, transformation to the baseband and sampling, resulting in a discrete-time signal that is refer to as the received signal 200. The received signal is essentially a sequence of complex samples that are transformed in block 201 into an image including one or more channels. Each image channel is formatted into a matrix of two columns and multiple rows, where the first column contains the real part and the second column contains the imaginary part of the complex numbers associated with that channel. In some implementations, the order of the first and the second column is reversed.

The resulting image 202 is input to the processor 205 which executes a jammer suppression block 206 and symbol detection block 208. The jammer suppression block suppresses the jamming signal from the received signal and outputs de-jammed received signal. It implements convolutional neural network whose parameters or weights are trained offline and stored in memory 203. Thus, the jammer suppression block 206 reads weight values from the memory 203, processes the input image 202 and outputs an estimate of the mixture of the active users' transmitted signals 207. This estimate is processed in symbol detection block 208 which detects indices of active users and their transmitted symbols. Those estimates 204 are supplied to the output interface 209.

Figure 2B:
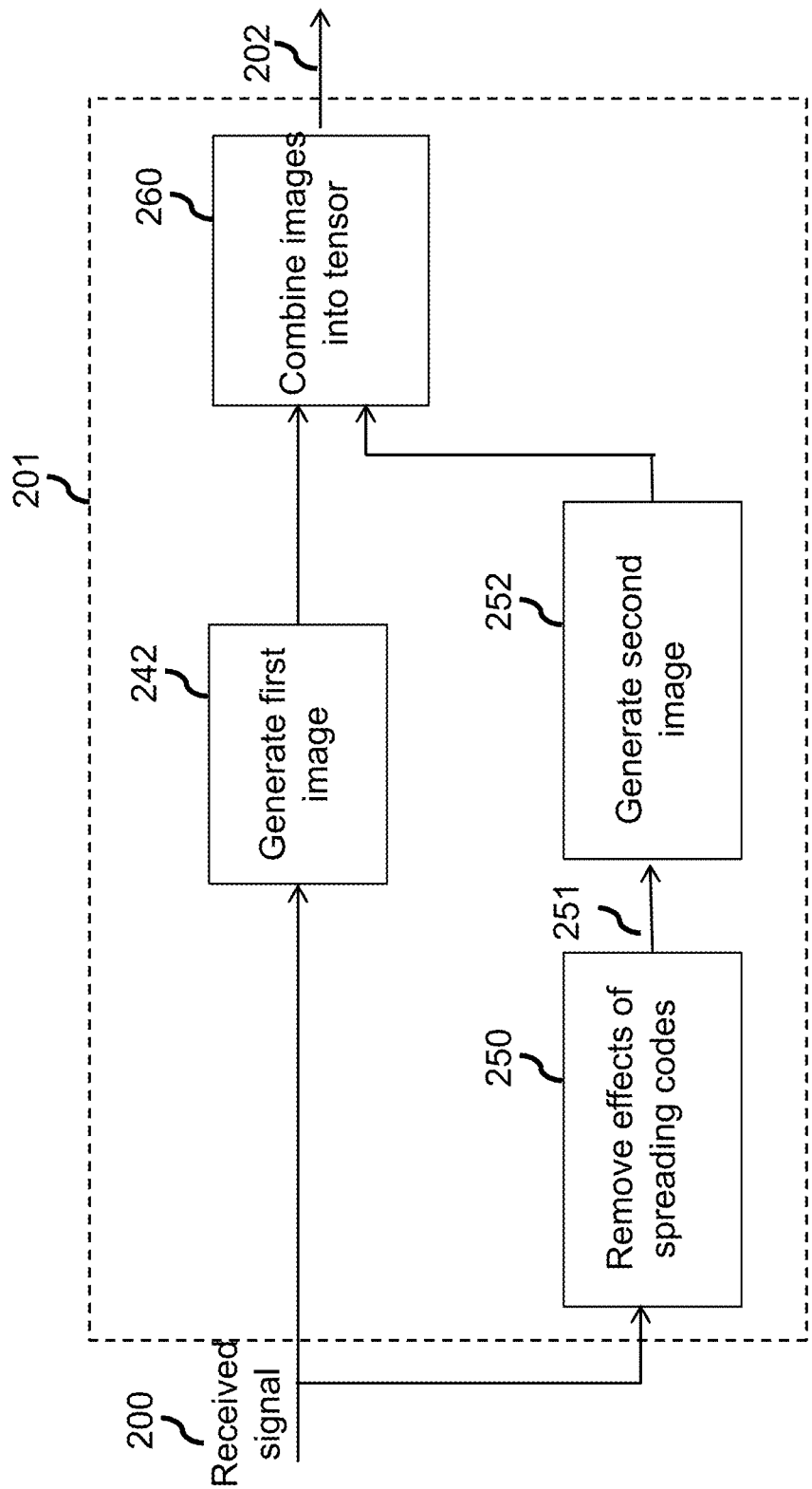
FIG. 2B shows a method for transforming the sequence of complex numbers 201 according to one embodiment.

FIG. 2B shows a method for transforming the sequence of complex numbers 201 according to one embodiment. The received signal 200 is formatted to generate first image in block 242 such that the resulting image is a matrix containing real and imaginary parts of the input complex sequence arranged in its columns. The received signal is filtered through the filter bank 250 whose number of filters is equal to the number of spreading codes 140c where each filter is tuned to one spreading codes so as the effects of spreading codes are removed from the mixture of active users' signals in the received signal. The length of the output sequence 251 from the filter bank is equal to the length of the input sequence 200. The output sequence 251 is formatted into the second image in block 252 also including two columns containing its real and imaginary parts. The two images are combined into a two-channel tensor in block 260 and supplied as the resulting image 202 to the input of the jammer suppression block 206.

Deep Learning Model for Jammer Suppression

Figure 3A:
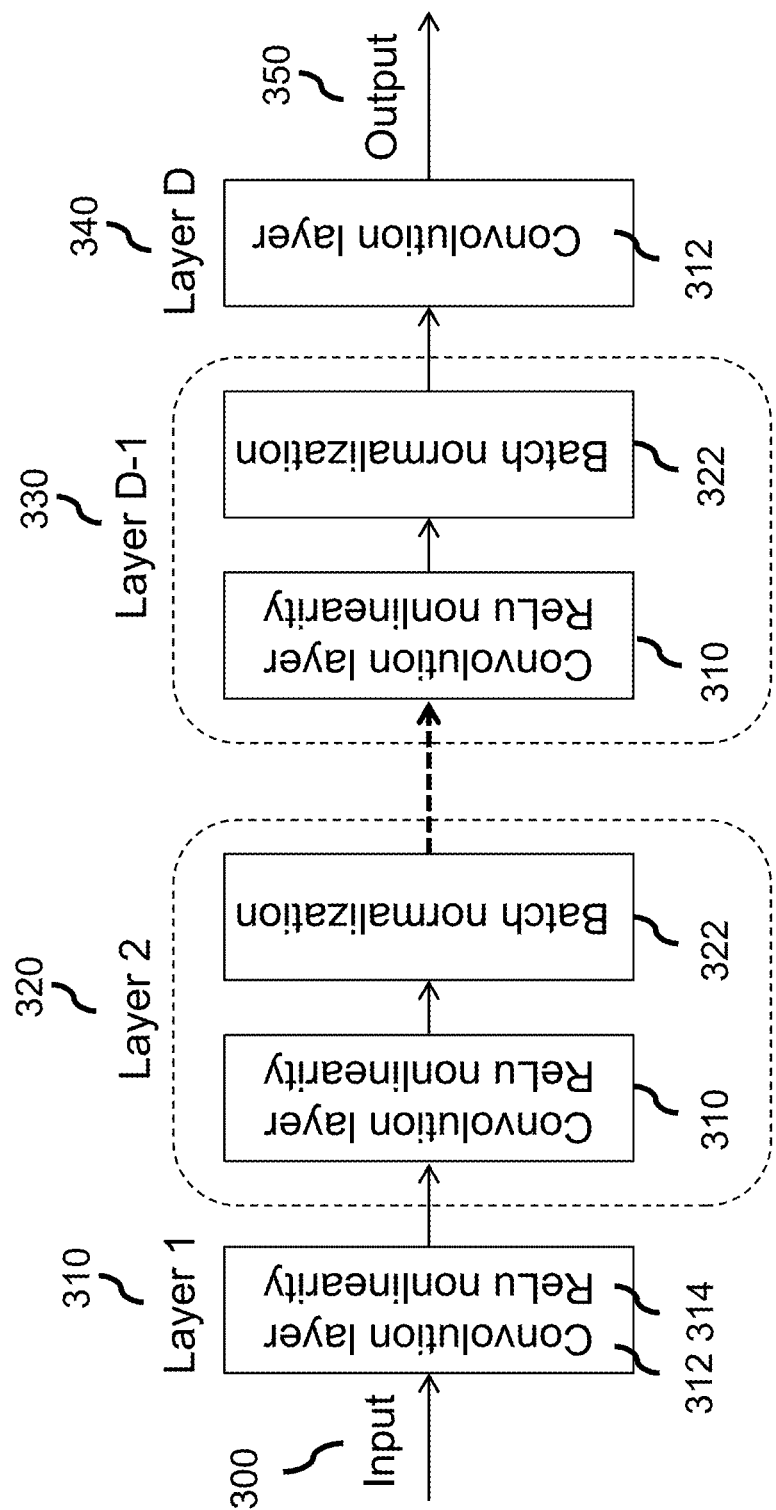
FIG. 3A shows an exemplar structure of a neural network used by some embodiment for signal de-jamming.

FIG. 3A shows an exemplar structure of a neural network used by some embodiment for signal de jamming. In some embodiments, the jammer suppression method is designed by learning a discriminative model that maps a pre-processed received signal r to the desired mixture of active users' signals y. To guide the selection of a deep learning (DL) model, some embodiments view jammer suppression problem as analogous in nature to image restoration problem, such as image denoising tasks. In some embodiments, building upon the image denoising model, jammer suppression block uses a convolutional neural network.

In one exemplar implementation of the convolutional neural network of FIG. 3A, the convolutional neural network includes D layers 310, 320, 330, 340. Different layers may have the same or different structure. For example, some layers are nonlinear convolutional layers, where each such layer includes a convolutional layer 312 followed by a nonlinear mapping layer 314 for performing a convolution operation with nonlinear mapping of convolutional outputs. The convolution and nonlinear mapping perform the dejamming operation in a manner similar to denoising operation. The set of nonlinear convolutional layers is connected to an output convolutional layer.

In some embodiments, the nonlinear mapping layer includes rectified linear unit (ReLu) activation. This nonlinear mapping has no vanishing gradient problem. Alternative nonlinear mapping includes sigmoid activation, tangent hyperbolic activation, and leaky ReLu activation. In some embodiments, the convolutional neural network is trained with a set of batch normalization (BN) layers 322 paired with hidden nonlinear convolutional layers.

For example, the first layer 310 processes the input signal 300 through convolution sublayer 312, followed by ReLu activation 314. Each subsequent layer d, d=2, ..., D−1 320, 330, 340, employs the BN 322 to the ReLu activated output from the corresponding convolution sublayer. Finally, a single convolution sublayer 312 is the output layer 340 in the proposed DL model which produces an estimate of the mixture of active users' signals 350.

Notably, the BN employed in image denoising model after a convolution layer and before ReLu activation as a measure to mitigate vanishing gradient issue. In contrast, our numerical study indicates that implementing BN after ReLu activation yields better jammer suppression performance. Consequently, in some embodiments, the BN is the last processing step in each intermediate layer.

Additionally, or alternatively, some embodiments use different architectures of convolutional neural network for dejamming the signal. For example, some embodiments use network of convolutional layers described above without batch normalization. Some other embodiments may use denoising autoencoder architecture with convolutional layers with or without batch normalization. Yet some other embodiments use denoising autoencoder with fully connected layers in place of convolution layers.

Figure 3B:
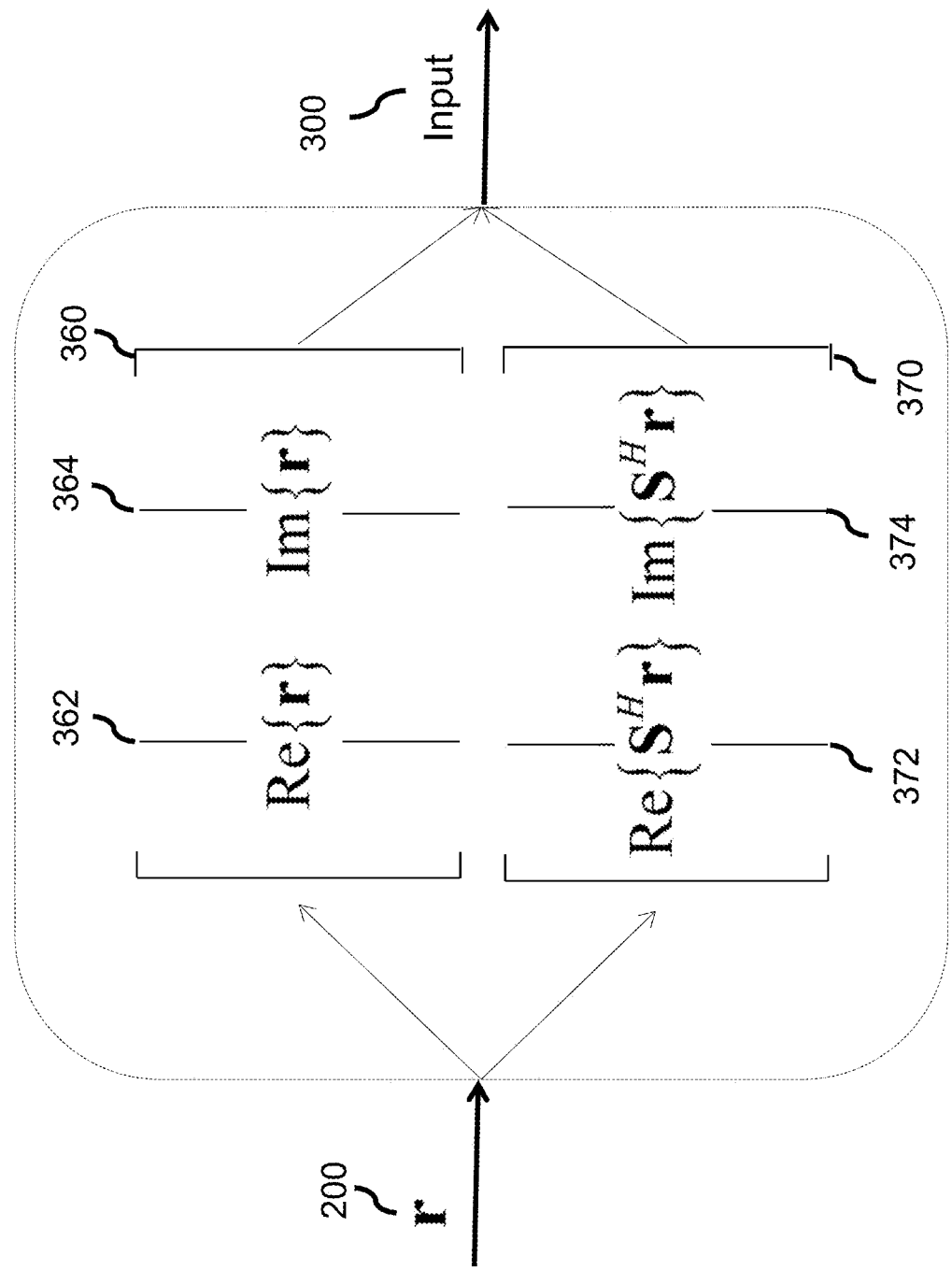
FIG. 3B shows a schematic of a structure of an input 300 to a dejamming neural network according to some embodiments.

FIG. 3B shows a schematic of a structure of an input 300 to a dejamming neural network according to some embodiments. For example, the input 300 to the proposed DL architecture is a tensor of two channels 360, 370. The first channel 360 is formatted into a two-column matrix which contains real 362 and imaginary 364 parts of the received signal r 200. The second channel 370 is also formatted into a two-column matrix, with real 372 and imaginary 374 parts of the matched filter bank (MFB) output $r_{MFB}$ in its columns. The MFB is formed with the set of spreading codes 140c. Namely, the received signal r is processed through the MFB of S filters, each tuned to one spreading sequence $s_j$, j=1, ..., S, $$r_{MFB} = S^H r \quad (6)$$

Therefore, the first channel is obtained as $$r[i,1] = \Re\{r[i]\} \quad (7)$$

$$r[i,2] = \Im\{r[i]\} \quad (8)$$

while the second channel is obtained as $$r'[i,1] = \Re\{r_{MFB}[i]\} \quad (9)$$

$$r'[i,2] = \Im\{r_{MFB}[i]\} \quad (10)$$

where i=1, ..., S.

Figure 3C:
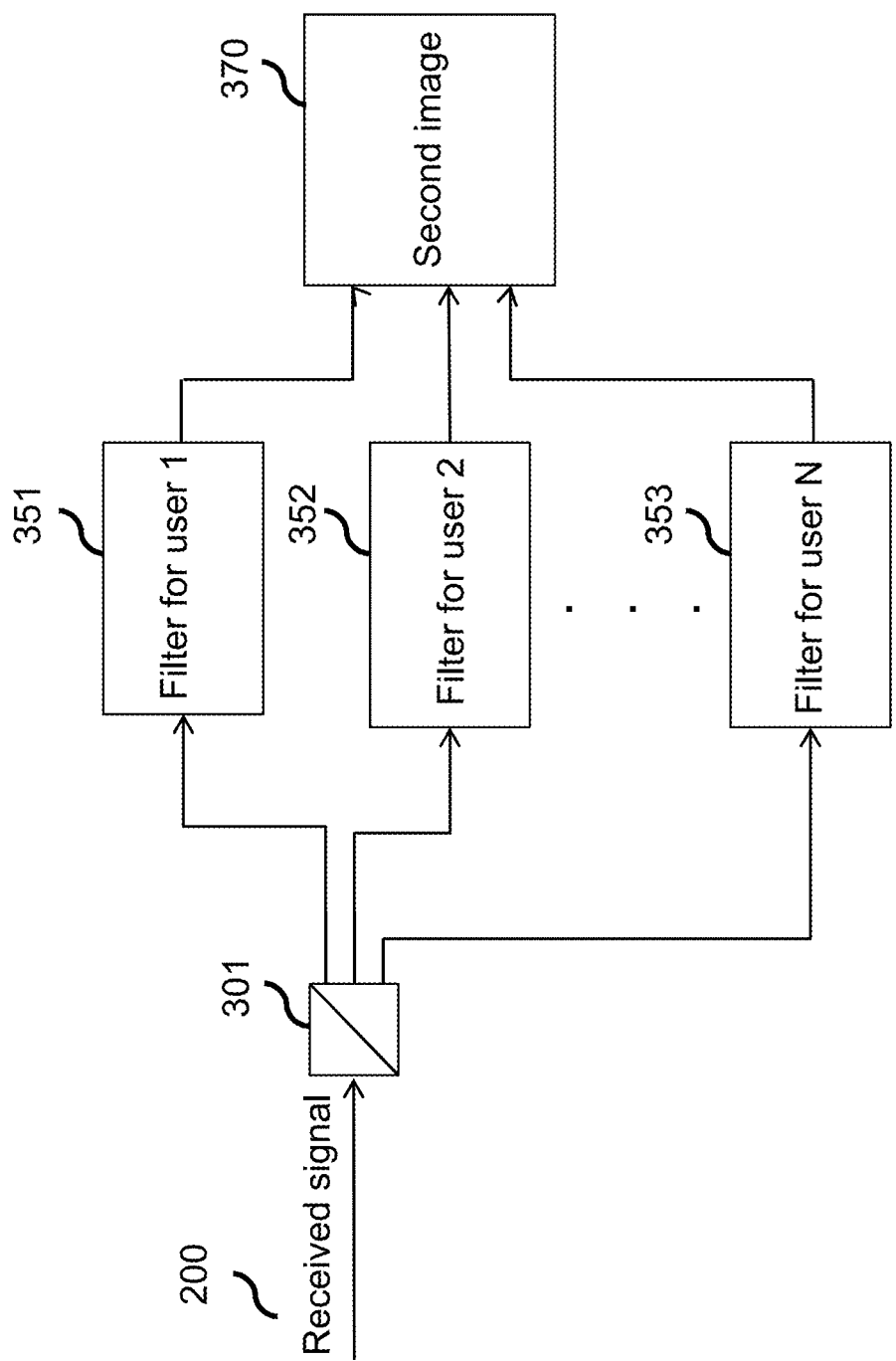
FIG. 3C shows a schematic of forming a second image of a tensor serving as an input to the de-jamming neural network according to some embodiments.

FIG. 3C shows a schematic of forming a second image of a tensor serving as an input to the dejamming neural network according to some embodiments. The received signal 200 goes through a splitter 301, whose each output is fed into input of one filter in the MFB. The template of each matched filter 351, 352 and 353 is spreading code of the corresponding user. Overall, the MFB contains N filters, one for each user. The outputs from the MFB is designed to include sufficient statistics for the detection of transmitted symbols in the considered signaling interval.

In such a manner, the second image 370 is formed by processing the sequence of complex numbers of the received signal 200 with a set of filters 351, 352 and 353, each filter corresponds to one of the spreading codes and configured to remove effects of the corresponding spreading code, to produce a filtered sequence of complex numbers. The filtered sequence of complex numbers is transformed into a second image 370 having at least two columns and multiple rows 372 and 374, wherein real values of real and imaginary parts of each complex number in the filtered sequence of complex numbers form different columns but the same row of the image. The embodiment combines the first image 360 and the second image 370 into a tensor 300 and process the tensor with the neural network, such as neural network of FIG. 3A, to suppress the wideband signal in the received signal.

Some embodiments are based on realization that the incorporation of the MFB output as one channel in the DL input tensor is particularly effective, as confirmed in the simulation study. For an intuitive justification of this step, note that the first convolution layer 312 computes weighted combination of the neighboring entries in the input tensor 300 over a patch whose dimension is given by the size of the convolution kernel. In particular, the entries from the ith row of the first channel correspond to the ith chip's samples of the received signal, while the ith row of the second channel is the noisy sum of the user i's transmitted symbol and weighted combination of the jamming signal's chip-rate samples, where the weights are the entries in the spreading code $s_i$. Thus, the first convolution layer combines several consecutive samples of the jamming signal and the weighted combinations of the entire jamming signal, as well as the same number of consecutive samples of the mixture of active users' signals and the symbols transmitted by active users.

More specifically, the entries in the ith row of the first channel are the real and imaginary parts of $$r[i] = \sum_{n=1}^{N} \bar{h}_n x_n s_n[i] + z[i] + v[i], \quad (11)$$

where $\|g\|2/2$ denotes the l2 norm of vector g. Hence, the ith row of the first channel contains information on the ith sample of the jamming signal and the ith sample of the mixture of active users' transmitted signals. On the other hand, the entries in the ith row of the second channel are the real and imaginary parts of $$r_{MFB}[i] = \bar{h}_i x_i \|s_i\|2/2 + s_i^H z + s_i^H v \quad (12)$$

i.e., the ith row of the second channel contains information of a weighed combination of all jamming signal samples and directly depends on the transmitted symbol from the ith user $x_i$.

Figure 3D:
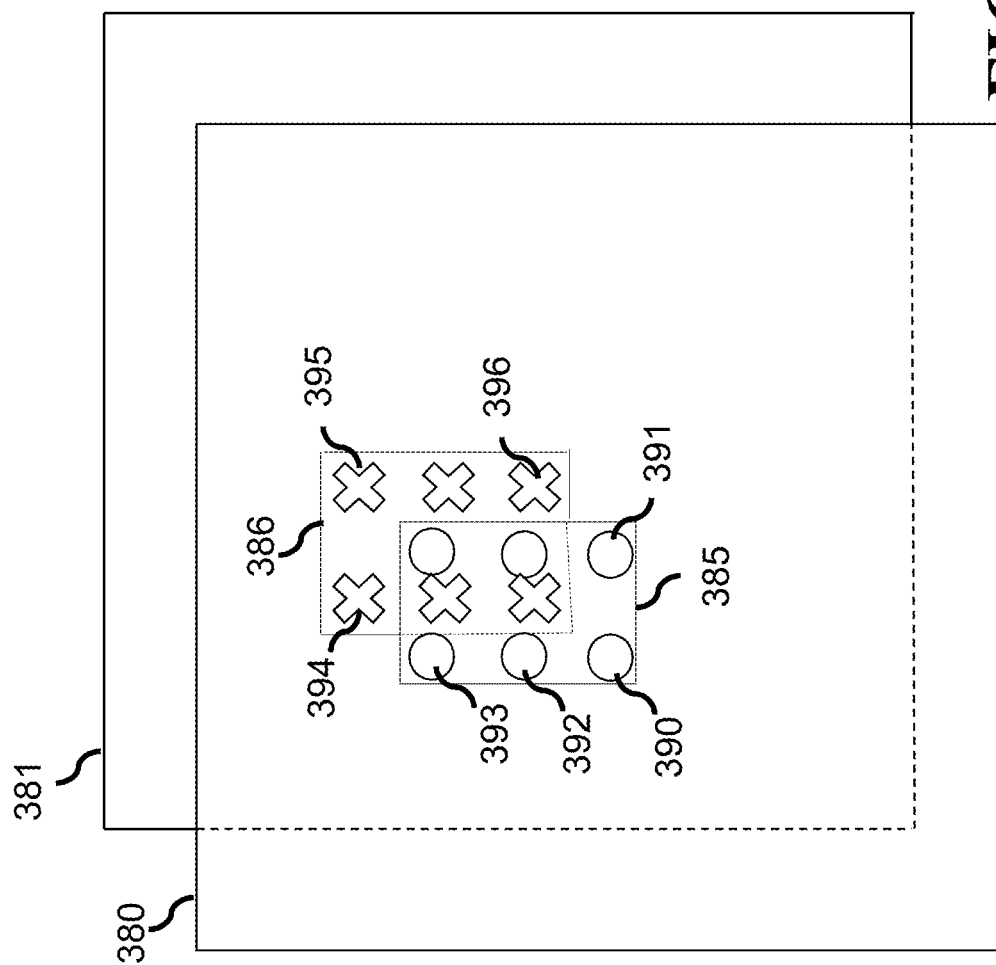
FIG. 3D shows a schematic of computation within a patch in a convolution sublayer according to some embodiments.

FIG. 3D shows a schematic of computation within a patch in a convolution sublayer according to some embodiments. The dimensions of the convolution kernel determine which consecutive entries in the input tensor are linearly combined during convolution layer processing. As depicted in FIG. 3D, assuming the kernel size is 3-by-2, the entries from three consecutive rows and both columns from each of the input channels 380, 381 are linearly combined. As such, the patch 385 in the first channel "covers" entries from three consecutive rows and both columns in the first channel, while the patch 386 in the second channel "covers" the corresponding entries in the second channel Therefore, the real and imaginary parts of three samples of the mixture of the active users' transmitted signals and jamming signal 391, 390, 392, 393 are combined together with the samples carrying three weighted combinations of the jamming signal and transmitted symbols from the corresponding users 394, 395, 396. The resulting linear combination of the entries "covered" by the convolution kernel patch is an input to the subsequent ReLu activation.

Note that each convolution layer implements a certain number of convolution operations resulting in the same number of feature maps. Therefore, an input convolution layer produces a certain number, such as 32, of different linear combinations of entries carrying "local" and "global" information on the mixture of active users' transmitted signals and jamming signal. The remaining convolution layers compute certain numbers of feature maps containing weighted combinations of entries from their input tensors, such that the whole model combines "local" information, embodying consecutive samples of the useful signal y and jamming signal z, with the "global" information, comprising of transmitted symbols $x_j$ and jamming signal projected onto spreading codes, $s_j^H z$, with the goal to suppress the jamming signal z and yield the mixture of active users' signals y. We emphasize that the proposed DL model belongs to the class of model-driven DL, whereby enhancing a black-box DL model with communication-specific domain knowledge results in improved performance.

Some embodiments are based on additional realization, that since the received signal is a jammed useful signal, the input tensor 300 fed to the DL model resembles a distorted two-channel image and, hence, the expectation is that the DL model with the state-of-the-art image denoising performance is also a promising approach for de-jamming the received signal.

Learning DL Model Weights

The model weights w of the DL architecture are estimated by minimizing the squared $l_2$ norm of the error, $$w = \underset{w}{\operatorname{argmin}} \sum_{k=1}^{K} \|y_k - \mathcal{R}(r_k; w)\|^2 \quad (13)$$

where K is the number of training examples ($r_k$, $y_k$), generated according to (3) and (4), while $\mathcal{R}(\bullet; w)$ denotes the mapping from the received signal r to the DL output, parameterized by weights w.

Symbol Detection

Figure 4A:
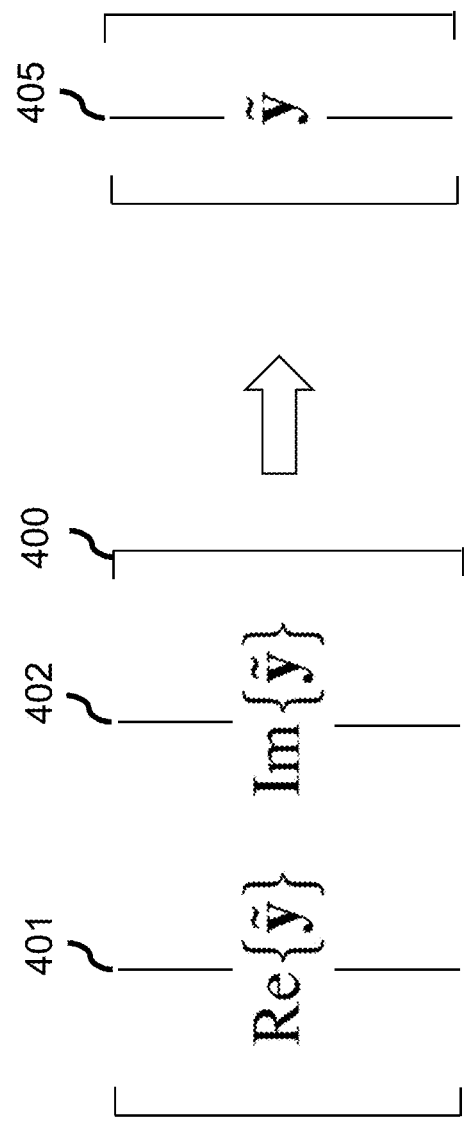
FIG. 4A shows a schematic of transforming an output of the de-jamming neural network for symbol detection according to one embodiment.

FIG. 4A shows a schematic of transforming an output of the de-jamming neural network for symbol detection according to one embodiment. Specifically, the neural network outputs a two column matrix of multiple rows, and the embodiment transforms the two column matrix into a sequence of complex numbers, each complex number corresponds to a row in the two column matrix. A real part of the complex number is formed by a value on the corresponding row in a first column in the two column matrix, and an imaginary part of the complex number is formed by a value on the corresponding row in a second column in the two column matrix. By doing so, some embodiments convert the processing into the complex domain, which is better suited for symbol detection. Alternative embodiments formulate symbol detection in real domain, however with much more cumbersome equations and associated processing steps.

For example, the output from the jammer suppression block 206 is a two-column matrix 400 which contains the real 401 and imaginary 402 parts of the de-jammed received signal in its columns. This output from the DL model is first mapped into a complex domain signal $y \in \mathbb{C}^{S \times 1}$ 405. Assuming the jammer suppression does not distort the mixture of the transmitted users' signals, the output y is given by $$y = \tilde{H}Sb + v \quad (14)$$

where v models the residual (unsuppressed) jamming signal and noise. The problem of detecting active users and their transmitted symbols from (14) is essentially a sparse recovery problem because only few users transmit at the same time resulting in a sparse vector of their symbols b.

Figure 4B:
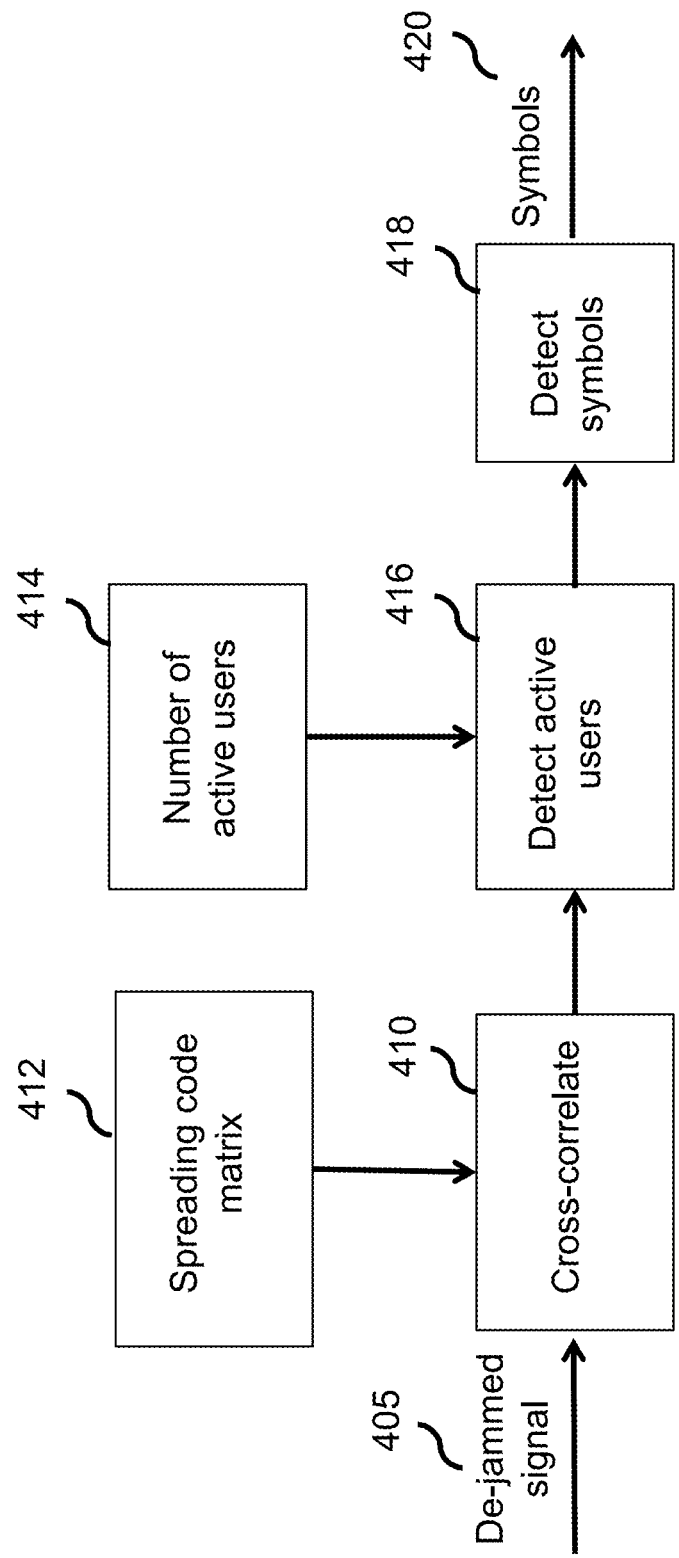
FIG. 4B shows a block diagram of detecting symbols in the signal received from the multiple transmitters when the transmission is encoded with the spreading codes according to some embodiments.

FIG. 4B shows a block diagram of detecting symbols in the signal received from the multiple transmitters when the transmission is encoded with the spreading codes according to some embodiments. In this embodiment, the processor of the receiver is configured to detect the symbols from the de-jammed signal using a cross-correlation between the de-jammed signal and each of the spreading code.

For example, in some implementations, the detection of active users and their transmitted symbols implements reduced dimension decorrelating (RDD) method in one embodiment shown in FIG. 4B. The RDD method cross-correlates in block 410 each column in the spreading code matrix S in block 412 with the de-jammed signal r 405, $$t_n = s_n^H y, \quad (15)$$

where $s_n$ is the n-th column of S. Assuming the number of active users K 414 is known, the active users are detected in block 416 from the indices of the K largest statistics $\{|t_n|\}_{n=1}^N$. Finally, the RDD detects the transmitted symbol 418 of an active user by finding the constellation symbol closest in the Euclidean sense to $t_i$ and outputs it as 420. We note that when spreading codes are orthogonal, the RDD becomes a conventional match filter bank (MFB). Overall, the RDD algorithm is a one-shot detector of active users and their symbols.

Figure 4C:
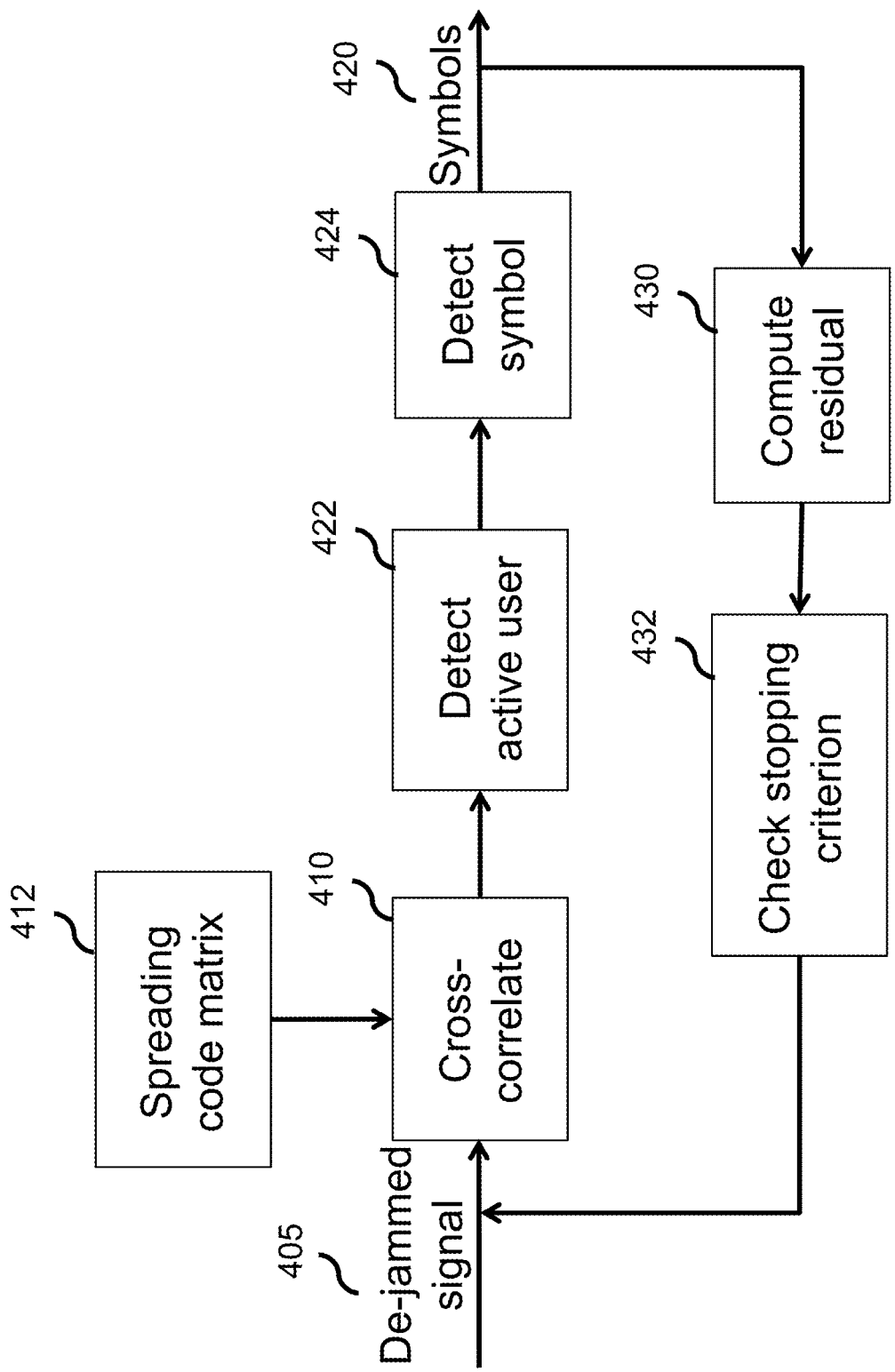
FIG. 4C shows a block diagram a method for detecting active users and their symbols using the reduced dimension decision feedback (RDDF) according to some embodiments.

FIG. 4C shows a block diagram a method for detecting active users and their symbols using the reduced dimension decision feedback (RDDF) according to some embodiments. For simplicity, this disclosure assumes all the channels are known and equal to 1. Otherwise, the RDDF requires the channel state information on the receiver size. The RDDF is an iterative procedure which follows principles of the successive interference cancellation (SIC), where one active user and its symbol are recovered in each iteration. Specifically, an active user in the k-th iteration is detected using cross-correlation in block 410 so that $$n_k = \operatorname{argmax}_n |[s_n^H v^{k-1}]| \quad (16)$$

where $v^{k-1}$ is the residual evaluated in the previous iteration. Note that $v^{(0)} = y$. In other words, the cross-correlation 410 is computed between the de-jammed signal 405 and each column of the spreading code matrix 412 in the first iteration. The k-th active user is detected 422 from the index of the largest magnitude of the cross-correlation $t_i = s_n^H v^{(k-1)}$. The transmitted symbol of the k-th active user, $\hat{b}_k$ is detected in block 424 by finding the constellation symbol closest in the Euclidean sense to $t_i$. Finally, the residual is updated in block 430

$$v^k = y - Sb^{(k)}, \quad (17)$$

where $b^{(k)}$ is the vector whose entries are the estimated symbols of the users recovered up to and including iteration k. The entries corresponding to all other users are 0. The obtained residual signal is input into the cross-correlation device in block 410 in the second and following iterations. The iterations are run until a certain stopping criterion in block 432 is satisfied. In case the number of active users K is known in advance, the number of iterations is equal to the number of active users. In case K is unknown, ad-hoc methods can be employed to estimate K. For example, the RDDF algorithm may run iterations as long as the power in the residual signal is greater than some threshold, dependent upon the noise variance. For example, the threshold can be equal to one-tenth of the noise variance.

Figure 4D:
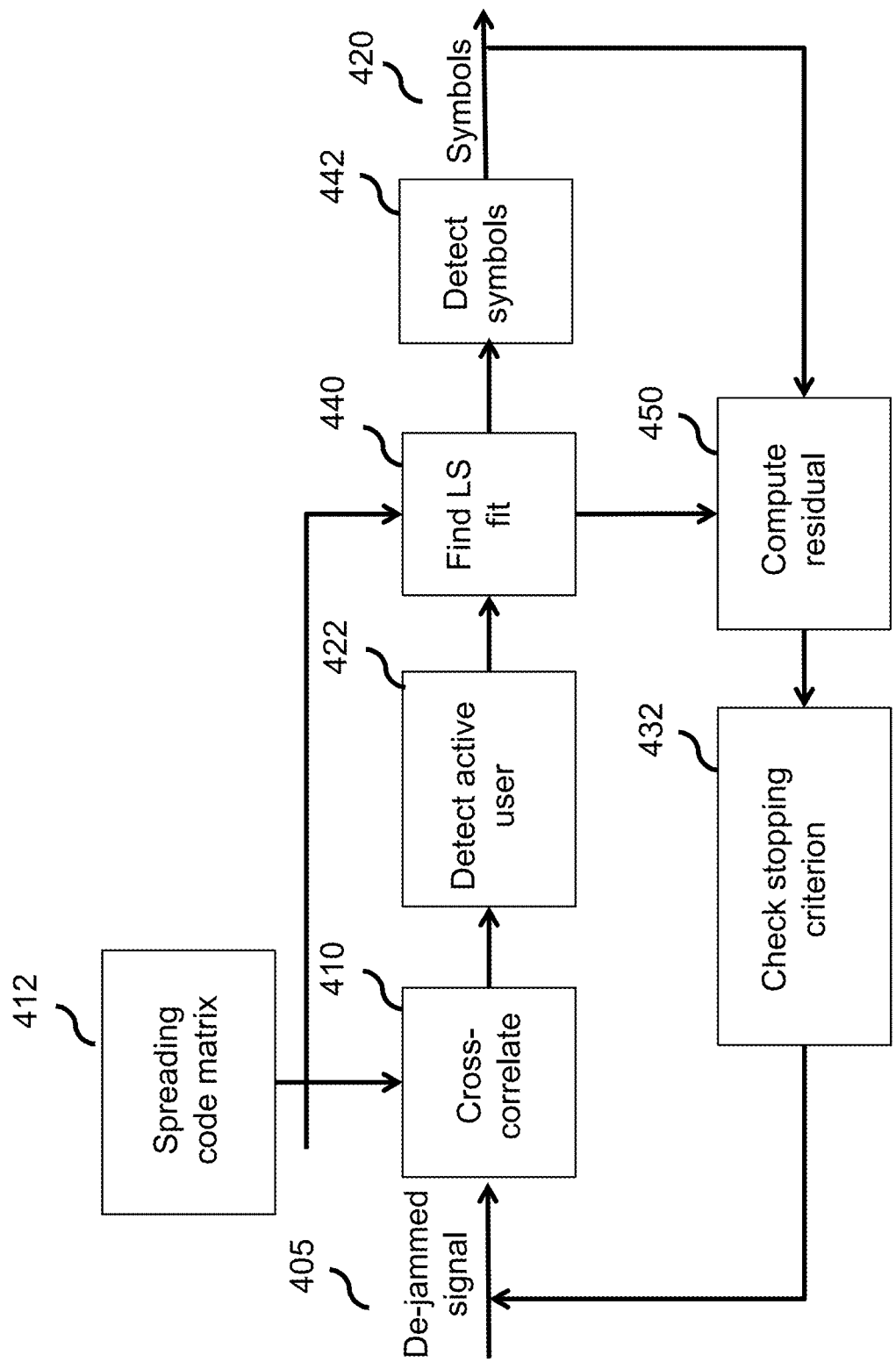
FIG. 4D shows a block diagram of a method for detecting the symbols from the de-jammed signal using a sparse recovery according to some embodiments.

FIG. 4D shows a block diagram of a method for detecting the symbols from the de-jammed signal using a sparse recovery according to some embodiments. For example, in one implementation, a sparse detection is based on the orthogonal matching pursuit (OMP) Contrary to the RDDF, the de-jammed signal 405 is represented in each iteration as the weighted sum of the columns in the spreading code matrix which correspond to active users detected up to and including that iteration. This is done by means of finding the least squares (LS) fit in block 440. The symbols of active users detected up to and including that iteration are detected in block 442 by finding the closest constellation points to the obtained LS weights. The residual signal is computed 450 as the difference between the de-jammed signal and the LS fit.

Figure 5:
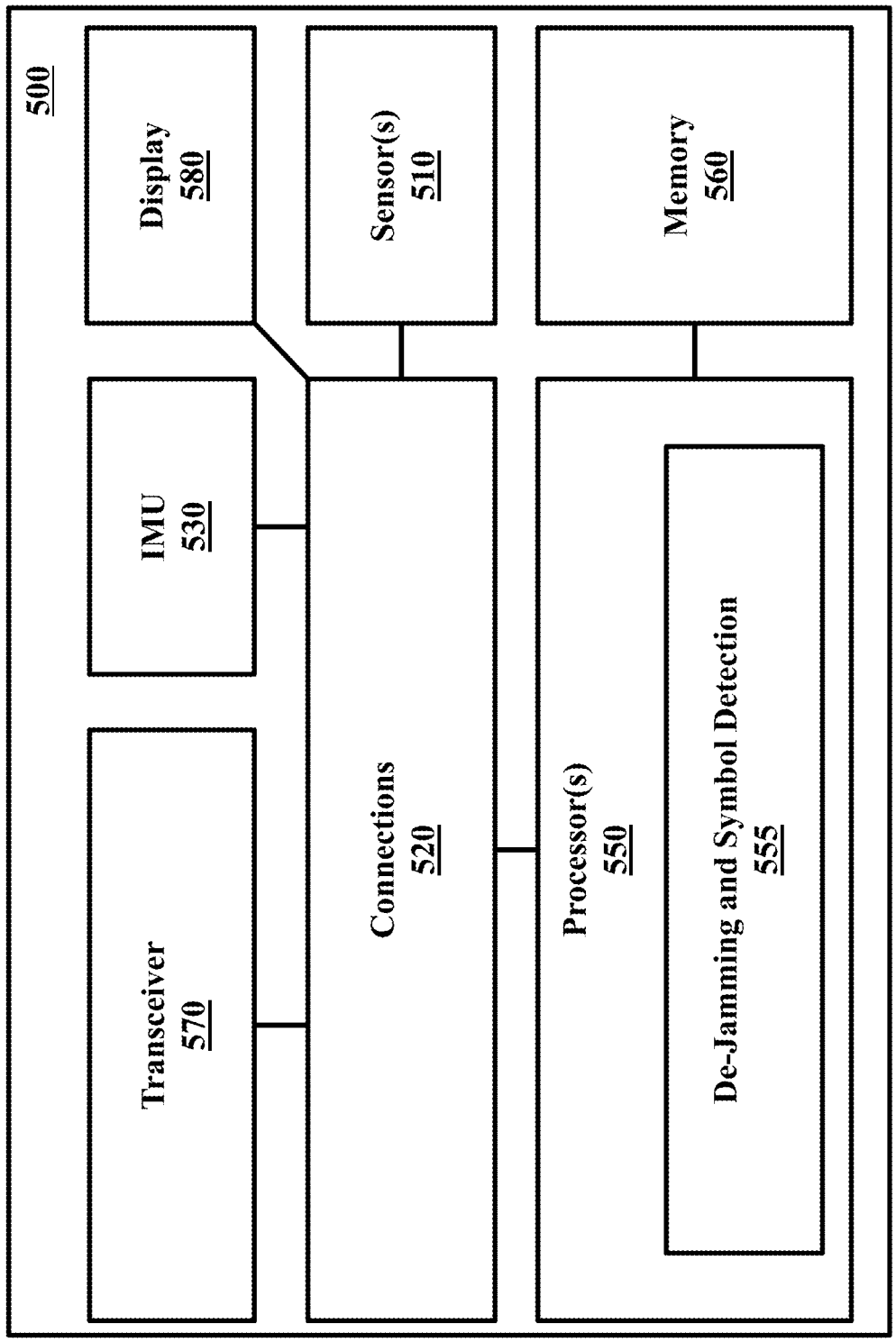
FIG. 5 shows a hardware diagram of a various components used in different combinations to implement a communication system 500 according to some embodiments.

FIG. 5 shows a hardware diagram of a various components used in different combinations to implement a communication system 500 according to some embodiments. The system 500 can include one or combination of a sensor 510, an inertial measurement unit (IMU) 530, a processor 550, a memory 560, a transceiver 570, and a display/screen 580, which can be operatively coupled to other components through connections 520. The connections 520 can comprise buses, lines, fibers, links or combination thereof.

The transceiver 570 can, for example, include a transmitter enabled to transmit one or more signals over one or more types of wireless communication networks and a receiver to receive one or more signals transmitted over the one or more types of wireless communication networks. The transceiver 570 can permit communication with wireless networks based on a variety of technologies such as, but not limited to, femtocells, Wi-Fi networks or wireless local area networks (WLANs), which may be based on the IEEE 802.11 family of standards, wireless personal area networks (WPANS) such Bluetooth, near field communication (NFC), networks based on the IEEE 802.15x family of standards, and/or wireless wide area networks (WWANs) such as LTE, WiMAX, etc. The system 500 can also include one or more ports for communicating over wired networks.

In some embodiments, the processor 550 can also receive input from IMU 530. In other embodiments, the IMU 530 can comprise 3-axis accelerometer(s), 3-axis gyroscope(s), and/or magnetometer(s). The IMU 530 can provide velocity, orientation, and/or other position related information to the processor 550. In some embodiments, the IMU 530 can output measured information in synchronization with the capture of each image frame by the sensor 510. In some embodiments, the output of the IMU 530 is used in part by the processor 550 to fuse the sensor measurements and/or to further process the fused measurements.

The system 500 can also include a screen or display 580 rendering images, such as color and/or depth images. In some embodiments, the display 580 can be used to display live images captured by the sensor 510, fused images, augmented reality (AR) images, graphical user interfaces (GUIs), and other program outputs. In some embodiments, the display 580 can include and/or be housed with a touchscreen to permit users to input data via some combination of virtual keyboards, icons, menus, or other GUIs, user gestures and/or input devices such as styli and other writing implements. In some embodiments, the display 580 can be implemented using a liquid crystal display (LCD) display or a light emitting diode (LED) display, such as an organic LED (OLED) display. In other embodiments, the display 580 can be a wearable display.

Exemplary system 500 can also be modified in various ways in a manner consistent with the disclosure, such as, by adding, combining, or omitting one or more of the functional blocks shown. For example, in some configurations, the system 500 does not include the IMU 530 or the sensors 510. In some embodiments, portions of the system 500 take the form of one or more chipsets, and/or the like.

The processor 550 can be implemented using a combination of hardware, firmware, and software. The processor 550 can represent one or more circuits configurable to perform at least a portion of a computing procedure or process related to de-jamming and symbol detection in block 555. The processor 550 retrieves instructions and/or data from memory 560. The processor 550 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 560 can be implemented within the processor 550 and/or external to the processor 550. As used herein the term "memory" refers to any type of long term, short term, volatile, nonvolatile, or other memory and is not to be limited to any particular type of memory or number of memories, or type of physical media upon which memory is stored. In some embodiments, the memory 560 holds program codes that facilitate de-jamming and symbol detection in block 555.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A communication system, comprising:
a receiver including an antenna to receive a signal including a sequence of complex numbers encoding symbols transmitted by multiple transmitters over wireless channels connecting the transmitters with the communication system, wherein the signal is jammed with a wideband signal;
a memory configured to store a neural network trained for denoising images formed by real and imaginary parts of complex numbers in the sequence of complex numbers representing the received signal;
a processor configured to
transform the sequence of complex numbers of the received signal into a first image of real numbers having two columns and multiple rows, wherein real and imaginary parts of each complex number form different columns but the same row of the first image;
process the first image with the neural network to suppress the wideband signal in the received signal to produce a de-jammed signal; and
detect the symbols transmitted by the transmitters from the de-jammed signal; and
an output interface configured to render the detected symbols.

2. The communication system of claim 1,
wherein each symbol is encoded with a spreading code selected from a set of spreading codes, and wherein the duration of the received signal is the duration of the selected spreading code, and wherein the length of the sequence of complex numbers of the signal is equal to the size of the set of spreading codes,
wherein the neural network is a convolutional neural network trained for denoising the images using the signals with encoded symbols and corresponding signals filtered from effects of the spreading codes, wherein the processor is further configured to
process the sequence of complex numbers of the received signal with a set of filters, each filter corresponds to one of the spreading codes and configured to remove effects of the corresponding spreading code, to produce a filtered sequence of complex numbers;
transform the filtered sequence of complex numbers into a second image having two columns and multiple rows, wherein real and imaginary parts of each complex number in the filtered sequence of complex numbers form different columns but the same row of the image;
combine the first image and the second image into a tensor; and
process the tensor with the neural network to suppress the wideband signal in the received signal.

3. The communication system of claim 1, wherein the neural network is a convolutional neural network.

4. The communication system of claim 3, wherein the convolutional neural network includes a set of nonlinear convolutional layers including a convolutional layer followed by a nonlinear mapping layer for performing a convolution operation with nonlinear mapping of convolutional outputs.

5. The communication system of claim 4, wherein the convolutional neural network is trained with a set of batch normalization layers paired with hidden nonlinear convolutional layers.

6. The communication system of claim 4, wherein the nonlinear mapping layer includes rectified linear unit (ReLu) activation.

7. The communication system of claim 4, wherein the set of nonlinear convolutional layers is connected to an output convolutional layer.

* * * * *